US012664073B2

(12) United States Patent
Jiang et al.

(10) Patent No.: US 12,664,073 B2
(45) Date of Patent: Jun. 23, 2026

(54) ONE REGRESSION DETECTION TESTING METHOD

(71) Applicant: Dell Products L.P., Round Rock, TX (US)

(72) Inventors: Changxu Jiang, Chengdu (CN); Robin Fei Wang, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 18/374,093

(22) Filed: Sep. 28, 2023

(65) Prior Publication Data

US 2025/0094321 A1 Mar. 20, 2025

(30) Foreign Application Priority Data

Sep. 19, 2023 (CN) .......................... 202311216284.3

(51) Int. Cl.
*G06F 11/3668* (2025.01)
(52) U.S. Cl.
CPC ........ *G06F 11/368* (2013.01); *G06F 11/3676* (2013.01); *G06F 11/3688* (2013.01)
(58) Field of Classification Search
CPC . G06F 11/3676; G06F 11/368; G06F 11/3688
See application file for complete search history.

(56) References Cited

U.S. PATENT DOCUMENTS

| | | | | |
|---|---|---|---|---|
| 8,276,123 B1 * | 9/2012 | Deng | .................... | G06F 11/368 |
| | | | | 717/124 |
| 2009/0265693 A1 * | 10/2009 | Bakowski | ........... | G06F 11/3688 |
| | | | | 717/131 |

(Continued)

OTHER PUBLICATIONS

Yingling Li et al., "An extensive study of class-level and method-level test case selection for continuous integration," 2020 [retrieved Jul. 23, 2025], Journal of Systems and Software, vol. 167, pp. 1-17, downloaded from <url>:https://www.sciencedirect.com/science/article/pii/S0164121220300923. (Year: 2020).*

(Continued)

*Primary Examiner* — S. Sough
*Assistant Examiner* — Stephen D Berman
(74) *Attorney, Agent, or Firm* — Krishnendu Gupta; Lesley Leonessa

(57) ABSTRACT

Methods, system, and non-transitory processor-readable storage medium for a regression detection testing system are provided herein. An example method includes receiving a pull request to merge software code changes and parsing a pull request code difference file to identify a plurality of software modules and software functions. A test case attribute associated with a test case is queried to identify a software module associated with the test case. If the plurality of software modules and software functions comprises the software module, the test case is added to a first plurality of test cases. If the plurality of software modules and software functions comprises at least one software function, and the test case comprises that software function, the test case is added to a second plurality of test cases. At least one of the first and the second plurality of test cases are executed on a test system.

20 Claims, 5 Drawing Sheets

(56) References Cited

U.S. PATENT DOCUMENTS

| | | | | |
|---|---|---|---|---|
| 2010/0058294 A1* | 3/2010 | Best | ..................... | G06F 11/3688 717/122 |
| 2014/0282411 A1* | 9/2014 | Liemandt | ............ | G06F 11/3672 717/124 |
| 2016/0085663 A1* | 3/2016 | Best | ..................... | G06F 11/3684 714/38.1 |
| 2016/0291970 A1* | 10/2016 | Mallisetty | ............. | G06F 11/368 |
| 2018/0069967 A1* | 3/2018 | Mandry | ................ | G06F 3/1211 |
| 2021/0209010 A1* | 7/2021 | Durairaj | .................... | G06F 8/70 |
| 2021/0390036 A1* | 12/2021 | Marzec | ............... | G06F 11/1004 |
| 2022/0214872 A1* | 7/2022 | Kay | .......................... | G06F 8/71 |
| 2023/0025441 A1* | 1/2023 | Oguara | ................ | G06F 11/368 |
| 2023/0068689 A1* | 3/2023 | Dutta | .................. | G06F 11/3676 |
| 2024/0020219 A1* | 1/2024 | Jain | ........................... | G06F 8/71 |
| 2024/0289261 A1* | 8/2024 | Walker | ................ | G06F 11/3688 |
| 2024/0311272 A1* | 9/2024 | Schaefer | ................ | G06N 5/022 |
| 2025/0061047 A1* | 2/2025 | Sun | ..................... | G06F 11/3692 |

OTHER PUBLICATIONS

Sebastian Elbaum et al., "Techniques for improving regression testing in continuous integration development environments," 2014 [ retrieved Nov. 4, 2025], Proceedings of the 22nd ACM SIGSOFT International Symposium on Foundations of Software Engineering, pp. 235-245, downloaded from <url>:https://dl.acm.org (Year: 2014).*

Lorenzo Gasparini et al., "ChangeViz: Enhancing the GitHub Pull Request Interface with Method Call Information," 2021 [retrieved Nov. 4, 2025], Working Conference on Software Visualization (VISSOFT), pp. 115-119, downloaded from <url>:https://ieeexplore. ieee.org/abstract/document/9604885. (Year: 2021).*

August Shi et al., "Understanding and Improving Regression Test Selection in Continuous Integration," 2019 [retrieved Nov. 4, 2025], IEEE 30th International Symposium on Software Reliability Engineering, pp. 228-238, downloaded from <url>:https://ieeexplore. ieee.org/abstract/document/8987498. (Year: 2019).*

Marko Vasic et al., "File-level vs. module-level regression test selection for .NET", Aug. 21, 2017 [retrieved Feb. 6, 2026], ESEC/FSE 2017: Proceedings of the 2017 11th Joint Meeting on Foundations of Software Engineering, pp. 843-853, downloaded from <url>:https://dl.acm.org/doi/abs/10.1145/3106237.3117763. (Year: 2017).*

Swarnendu Biswas et al., "Regression Test Selection Techniques: A Survey", 2011 [retrieved Feb. 6, 2026], pp. 1-34, downloaded from <url>:https://informatica.si/index.php/informatica/article/viewFile/355/356. (Year: 2011).*

Lingming Zhang, "Hybrid regressions test selection", May 17, 2018 [retrieved Feb. 6, 2026], ICSE '18: Proceedings of the 40th International Conference on Software Engineering, pp. 199-209, downloaded from <url>:https://dl.acm.org/doi/pdf/10.1145/3180155. 3180198. (Year: 2018).*

* cited by examiner

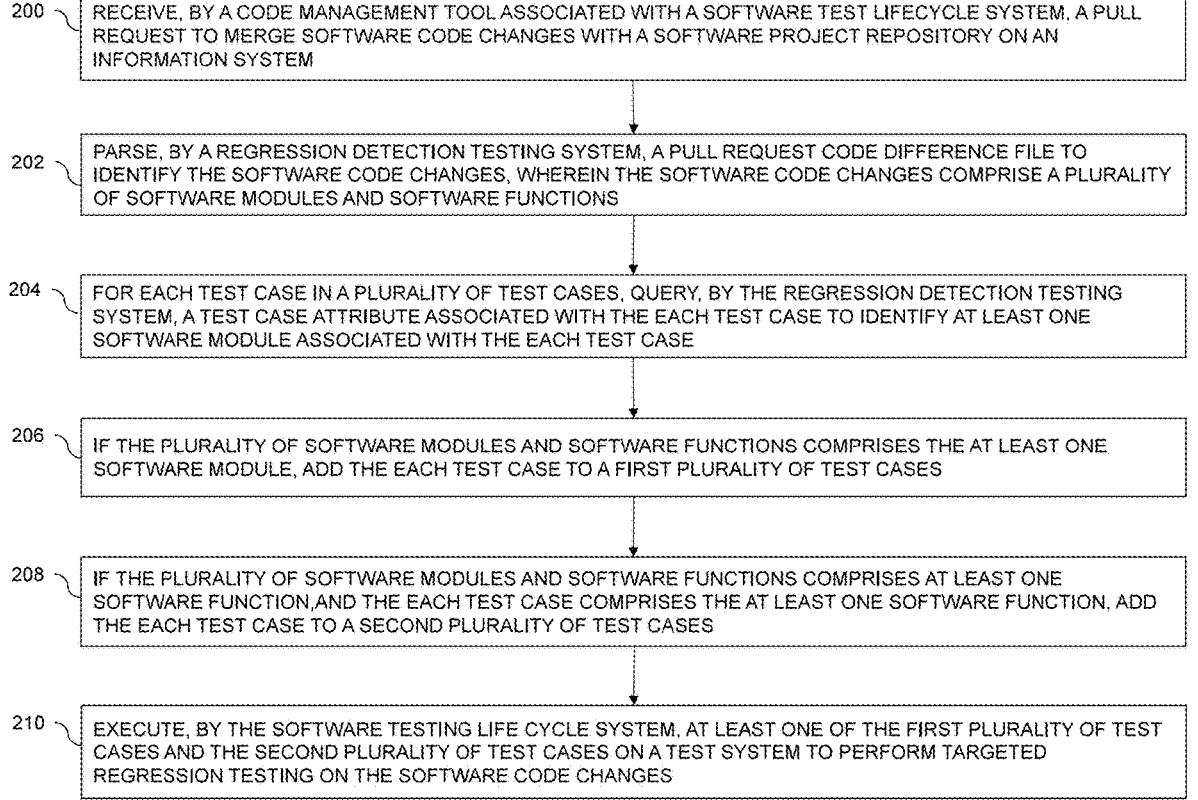

200 — RECEIVE, BY A CODE MANAGEMENT TOOL ASSOCIATED WITH A SOFTWARE TEST LIFECYCLE SYSTEM, A PULL REQUEST TO MERGE SOFTWARE CODE CHANGES WITH A SOFTWARE PROJECT REPOSITORY ON AN INFORMATION SYSTEM

202 — PARSE, BY A REGRESSION DETECTION TESTING SYSTEM, A PULL REQUEST CODE DIFFERENCE FILE TO IDENTIFY THE SOFTWARE CODE CHANGES, WHEREIN THE SOFTWARE CODE CHANGES COMPRISE A PLURALITY OF SOFTWARE MODULES AND SOFTWARE FUNCTIONS

204 — FOR EACH TEST CASE IN A PLURALITY OF TEST CASES, QUERY, BY THE REGRESSION DETECTION TESTING SYSTEM, A TEST CASE ATTRIBUTE ASSOCIATED WITH THE EACH TEST CASE TO IDENTIFY AT LEAST ONE SOFTWARE MODULE ASSOCIATED WITH THE EACH TEST CASE

206 — IF THE PLURALITY OF SOFTWARE MODULES AND SOFTWARE FUNCTIONS COMPRISES THE AT LEAST ONE SOFTWARE MODULE, ADD THE EACH TEST CASE TO A FIRST PLURALITY OF TEST CASES

208 — IF THE PLURALITY OF SOFTWARE MODULES AND SOFTWARE FUNCTIONS COMPRISES AT LEAST ONE SOFTWARE FUNCTION, AND THE EACH TEST CASE COMPRISES THE AT LEAST ONE SOFTWARE FUNCTION, ADD THE EACH TEST CASE TO A SECOND PLURALITY OF TEST CASES

210 — EXECUTE, BY THE SOFTWARE TESTING LIFE CYCLE SYSTEM, AT LEAST ONE OF THE FIRST PLURALITY OF TEST CASES AND THE SECOND PLURALITY OF TEST CASES ON A TEST SYSTEM TO PERFORM TARGETED REGRESSION TESTING ON THE SOFTWARE CODE CHANGES

FIG. 2

ONE REGRESSION DETECTION TESTING METHOD

FIELD

The field relates generally to optimizing selection of regression test cases, and more particularly to optimizing selection of regression test cases in information processing systems.

BACKGROUND

During the lifecycle of complex software system development, many tests are performed to ensure high quality and effective functionality. New features are added incrementally to previous software releases. Regression tests are executed to ensure the new code changes have not introduced new problems. There may be thousands of system regression test cases for complicated information processing systems, such as storage products.

SUMMARY

Illustrative embodiments provide techniques for implementing a regression detection testing system in a storage system. For example, illustrative embodiments receive, by a code management tool associated with a software test lifecycle system, a pull request to merge software code changes with a software project repository on an information system. A regression detection testing system parses a pull request code difference file to identify the software code changes, where the software code changes comprise a plurality of software modules and software functions. For each test case in a plurality of test cases, the regression detection testing system queries a test case attribute associated with that test case to identify at least one software module associated with that test case. If the plurality of software modules and software functions comprise at least one software module, the regression detection testing system adds that test case to a first plurality of test cases. If the plurality of software modules and software functions comprises at least one software function, and the test case comprises that software function, the regression detection testing system adds that test case to a second plurality of test cases. The software testing life cycle system executes at least one of the first plurality of test cases and the second plurality of test cases on a test system to perform targeted regression testing on the software code changes. Other types of processing devices can be used in other embodiments. These and other illustrative embodiments include, without limitation, apparatus, systems, methods and processor-readable storage media.

BRIEF DESCRIPTION OF THE DRAWINGS

FIG. 2 shows a flow diagram of a process for a regression detection testing system in an illustrative embodiment.

DETAILED DESCRIPTION

Figure 1:
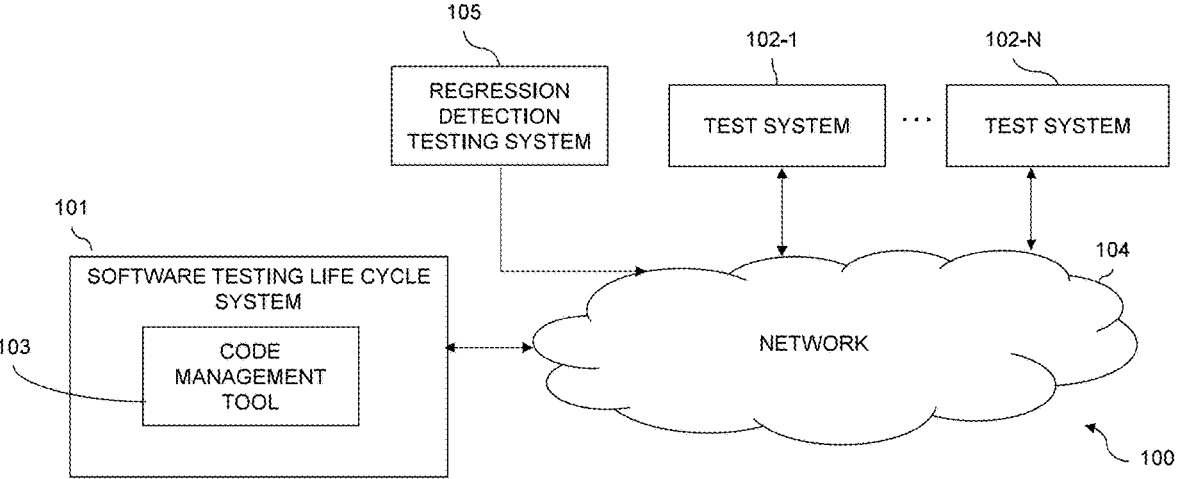
FIG. 1 shows an information processing system including a regression detection testing system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a regression detection testing system, which technique may be used to provide, among other things regression test case selection optimization by receiving, by a code management tool associated with a software test lifecycle system, a pull request to merge software code changes with a software project repository on an information system. A regression detection testing system parses a pull request code difference file to identify the software code changes, where the software code changes comprise a plurality of software modules and software functions. For each test case in a plurality of test cases, the regression detection testing system queries a test case attribute associated with that test case to identify at least one software module associated with that test case. If the plurality of software modules and software functions comprise at least one software module, the regression detection testing system adds that test case to a first plurality of test cases. If the plurality of software modules and software functions comprises at least one software function, and the test case comprises that software function, the regression detection testing system adds that test case to a second plurality of test cases. The software testing life cycle system executes at least one of the first plurality of test cases and the second plurality of test cases on a test system to perform targeted regression testing on the software code changes.

It is generally not feasible to execute all the available test cases in continuous integration (CI) testing when merging a pull request. Typically, a "must pass" group of test cases is chosen as a must pass test suite for each pull request to execute, and it is a challenge to select the test cases for the "must pass" group. If the total execution time of the "must pass" group is too long, valuable and limited resources are tied up, and the pull request must wait for completion of those test before merging. Additionally, although the "must pass" group of test cases may have hundreds of test cases, those test cases might not target testing the software code changes in the pull request. Regression test cases must be executed to ensure that newly implemented features do not impact existing functionality. As noted above, there may be thousands of regression test cases. Yet, resources to execute those regression test cases may be limited. Therefore, it is crucial to select the most valuable subset of regression test cases to execution from the set of regression test cases.

Conventional technologies do not select a set of test cases to execute for regression testing that cover the modules and functions having software code changes in the pull request to obtain the most targeted regression validation result. Conventional technologies do not provide selection of the best regression test cases to adequately provide regression testing coverage of the software code changes in a pull request, especially when resources are limited. Conventional technologies do not map the test cases and/or test case suites to the covered product code modules and functions by analyzing the difference of coverage between the coverage result of a test execution cycle and the base code coverage result. Conventional technologies do not provide a mapping relationship to automatically update the mapping. Conventional technologies do not provide a way to select test cases based on the product code changes in a pull request. Conventional technologies do not provide a "light weight" set of test cases to target the software code changes in a pull request. Conventional technologies do not provide a selectable set of test cases with which to regression test the software code changes in the pull request.

By contrast, in at least some implementations in accordance with the current technique as described herein, regression test case selection is optimized by receiving, by a code management tool associated with a software test lifecycle system, a pull request to merge software code changes with a software project repository on an information system. A regression detection testing system parses a pull request code difference file to identify the software code changes, where the software code changes comprise a plurality of software modules and software functions. For each test case in a plurality of test cases, the regression detection testing system queries a test case attribute associated with each test case to identify at least one software module associated with each test case. If the plurality of software modules and software functions comprise at least one software module, the regression detection testing system adds that test case to a first plurality of test cases. If the plurality of software modules and software functions comprises at least one software function, and the test case comprises that software function, the regression detection testing system adds that test case to a second plurality of test cases. The software testing life cycle system executes at least one of the first plurality of test cases and the second plurality of test cases on a test system to perform targeted regression testing on the software code changes.

Thus, a goal of the current technique is to provide a method and a system for selecting a set of test cases to execute for regression testing that cover the modules and functions having software code changes in the pull request to obtain the most targeted regression validation result. Another goal is to provide selection of the best regression test cases to adequately provide regression testing coverage of the software code changes in a pull request, especially when resources are limited. Another goal is to map the test cases and/or test case suites to the covered product code modules and functions by analyzing the difference of coverage between the coverage result of a test execution cycle and the base code coverage result. Another goal is to provide a mapping relationship and to automatically update the mapping. Another goal is to provide a way to select test cases based on the product code changes in a pull request. Another goal is to provide a "light weight" set of test cases to target the software code changes in a pull request. Yet another goal is to provide a selectable set of test cases with which to regression test the software code changes in the pull request.

In at least some implementations in accordance with the current technique described herein, the use of a regression detection testing system can provide one or more of the following advantages: select a set of test cases to execute for regression testing that cover the modules and functions having software code changes in the pull request to obtain the most targeted regression validation result, provide selection of the best regression test cases to adequately provide regression testing coverage of the software code changes in a pull request, especially when resources are limited, map the test cases and/or test case suites to the covered product code modules and functions by analyzing the difference of coverage between the coverage result of a test execution cycle and the base code coverage result, provide a mapping relationship to automatically update the mapping, provide a way to select test cases based on the product code changes in a pull request, provide a "light weight" set of test cases to target the software code changes in a pull request, and provide a selectable set of test cases with which to regression test the software code changes in the pull request.

In contrast to conventional technologies, in at least some implementations in accordance with the current technique as described herein, regression test case selection is optimized by receiving, by a code management tool associated with a software test lifecycle system, a pull request to merge software code changes with a software project repository on an information system. A regression detection testing system parses a pull request code difference file to identify the software code changes, where the software code changes comprise a plurality of software modules and software functions. For each test case in a plurality of test cases, the regression detection testing system queries a test case attribute associated with each test case to identify at least one software module associated with each test case. If the plurality of software modules and software functions comprise at least one software module, the regression detection testing system adds that test case to a first plurality of test cases. If the plurality of software modules and software functions comprises at least one software function, and the test case comprises that software function, the regression detection testing system adds that test case to a second plurality of test cases. The software testing life cycle system executes at least one of the first plurality of test cases and the second plurality of test cases on a test system to perform targeted regression testing on the software code changes.

In an example embodiment of the current technique, the software testing life cycle system completes the pull request to merge the software code changes with the software project repository.

In an example embodiment of the current technique, a dataset identifies the software code changes, where each element in the dataset comprises a subset of the plurality of software functions and where each of the subset is associated with a respective software module in the plurality of software modules.

In an example embodiment of the current technique, the code management tool receives a request to execute the targeted regression testing on the software code changes.

In an example embodiment of the current technique, the regression detection testing system creates the pull request code difference file by analyzing the software code changes in the pull request.

In an example embodiment of the current technique, the regression detection testing system identifies each of the software modules associated with each test case.

In an example embodiment of the current technique, the regression detection testing system executes a code coverage analysis tool on a plurality of test case groups to identify whether each test case provides coverage on at least one of at least one software module and at least one software function, where the plurality of test case groups comprises each test case, and updates the test case attribute when the test case provides the coverage.

In an example embodiment of the current technique, the regression detection testing system executes the code coverage analysis tool to determine a test coverage difference between a baseline code coverage result and a test execution cycle coverage result.

In an example embodiment of the current technique, the regression detection testing system executes the code coverage analysis tool on the plurality of test case groups associated with a product code integration branch associated with the code management tool.

In an example embodiment of the current technique, the regression detection testing system updates the test case attribute when each test case comprises at least one software module.

In an example embodiment of the current technique, the regression detection testing system updates the test case attribute when at least one software module comprises at least one software function.

In an example embodiment of the current technique, the regression detection testing system updates the test case attribute when each test case is created.

In an example embodiment of the current technique, the regression detection testing system updates the test case attribute when each test case is modified.

In an example embodiment of the current technique, the regression detection testing system determines at least one software module associated with each test case comprises at least a first software function, prior to adding each test case to the first plurality of test cases.

In an example embodiment of the current technique, the regression detection testing system selects at least one of the first plurality of test cases and the second plurality of test cases based on the pull request.

In an example embodiment of the current technique, the regression detection testing system determines the software code changes impact more product code changes in software modules in the plurality of software modules and software functions, and selects the first plurality of test cases to execute on the test system.

In an example embodiment of the current technique, the regression detection testing system determines the software code changes impact more product code changes in software functions in the plurality of software modules and software functions, and selects the second plurality of test cases to execute on the test system.

In an example embodiment of the current technique, the regression detection testing system determines not to execute the first plurality of test cases, and in response, selects the second plurality of test cases to execute on the test system.

FIG. 1 shows a computer network (also referred to herein as an information processing system) 100 configured in accordance with an illustrative embodiment. The computer network 100 comprises a software testing life cycle system 101, code management tool 103, regression detection testing system 105, and test systems 102-N. The software testing life cycle system 101, code management tool 103, regression detection testing system 105, and test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a regression detection testing system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the regression detection testing system 105 are one or more input-output devices, which illustratively comprise keyboards, displays or other types of input-output devices in any combination. Such input-output devices can be used, for example, to support one or more user interfaces to the regression detection testing system 105, as well as to support communication between the regression detection testing system 105 and other related systems and devices not explicitly shown. For example, a dashboard may be provided for a user to view a progression of the execution of the regression detection testing system 105. One or more input-output devices may also be associated with any of the test systems 102-N.

Additionally, the regression detection testing system 105 in the FIG. 1 embodiment is assumed to be implemented using at least one processing device. Each such processing device generally comprises at least one processor and an associated memory, and implements one or more functional modules for controlling certain features of the regression detection testing system 105.

More particularly, the regression detection testing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the regression detection testing system 105 to communicate over the network 104 with the software testing life cycle system 101, the code management tool 103, and test systems 102-N and illustratively comprises one or more conventional transceivers.

A regression detection testing system 105 may be implemented at least in part in the form of software that is stored in memory and executed by a processor, and may reside in any processing device. The regression detection testing system 105 may be a standalone plugin that may be included within a processing device.

It is to be understood that the particular set of elements shown in FIG. 1 for regression detection testing system 105 involving the software testing life cycle system 101, code management tool 103, and test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the regression detection testing system 105 can be on and/or part of the same processing platform.

An exemplary process of regression detection testing system 105 in computer network 100 will be described in more detail with reference to, for example, the flow diagram of FIG. 2.

FIG. 2 is a flow diagram of a process for execution of the regression detection testing system 105 in an illustrative embodiment. It is to be understood that this particular process is only an example, and additional or alternative processes can be carried out in other embodiments.

At 200, a code management tool 103 associated with a software test lifecycle system 101 receives a pull request to merge software code changes with a software project repository on an information system. For example, a bug fix pull request may have minor software code changes as compared to their respective covered product code modules and functions and then test cases are selected to execute the targeted regression testing to test the code changes in the pull request. More so, a selectable level of test cases is preferred. In an example embodiment, the regression detection testing system 105 receives a request to execute the targeted regression testing on the software code changes.

At 202, the regression detection testing system 105 parses a pull request code difference file to identify the software code changes, where the software code changes comprise a plurality of software modules and software functions represented as "A". In an example embodiment, the regression detection testing system 105 obtains the software code changes from the target product code merge pull request (PR). In an example embodiment, the regression detection testing system 105 creates the pull request code difference file by analyzing the software code changes in the pull request. In an example embodiment, the pull request difference file may be created, for example, using any sort of "diff" command where two files are compared to each other, and the output of the command is the difference between the two files.

In an example embodiment, the result of the parsing is a dataset that identifies the software code changes, where each element in the dataset comprises a subset of the plurality of software functions and where each of the subset is associated with a respective software module in the plurality of software modules. In an example embodiment, when the regression detection testing system 105 obtains the software code changes from the target product code merge pull request (PR), the software code changes are stored in the dataset. For example, "A" may represent the dataset that identifies the software code changes in the pull request "PR", where $A=[M1_{pr}, M2_{pr}, \ldots MK_{pr}]$, and where $Mk_{pr}$ is a list of functions in the pull request that have software code changes in module k, and where $k=[1, 2, \ldots, K]$. In an example embodiment, $Mk_{pr}=[\ ]$ if there are no software code changes for module k in the pull request. Listed below is an example use of a "diff" command:

```
https://xxx.../commit/01fe340631d32575f3cc5a2ae0bd67f664662322.diff
diff --git
a/cyc_app/cyclone/mapper/MDAmortization/MDDeltaOnDiskDestage2MgrActor.cxx
b/cyc_app/cyclone/mapper/MDAmortization/MDDeltaOnDiskDestage2MgrActor.cxx
index 084252fa6e325..858ad9a35dc38 100755
--- a/cyc_app/cyclone/mapper/MDAmortization/MDDeltaOnDiskDestage2MgrActor.cxx
+++ b/cyc_app/cyclone/mapper/MDAmortization/MDDeltaOnDiskDestage2MgrActor.cxx
@@ -242,15 +242,17 @@ MDDeltaOnDiskDestage2MgrActor::DestageWaitForStart( )
    }
    uint64_t pageListCount = 0;
-
-  DeferredRefcntBin::GetPageCount(&pageListCount,
PAGEBIN_GROUP_PRODUCER);
....
``` to a release bubble pull request or a feature merge pull request. Because of this, targeted regression testing is needed where test cases and/or test case suites are mapped In an example embodiment, based on the output of the "diff" command, the element $Mx_{pr}$ is constructed for module x:

```
{
Name of module x:
a/cyc_app/cyclone/mapper/MDAmortization/MDDeltaOnDiskDestage2MgrActor.cxx
Functions covered: {
```

-continued

```
    MDDeltaOnDiskDestage2MgrActor::DestageWaitForStart( ), <=== function name
    }
}
```

At 204, for each test case do in a plurality of test cases, the regression detection testing system queries a test case attribute $Cd_n$ associated with that test case do to identify at least one software module associated with that test case $d_n$. For example, $Cd_n$ represents a mapping relationship that records the software modules and software functions of a target product that are covered (i.e., tested) by test case $d_n$. The mapping relationship $Cd_n=[M1d_n, M2d_n, \ldots, MKd_n]$, where K is the number of modules for the target product code on which test cases are focused, and where $Mkd_n$ records whether test case do has coverage on product code module k. Function i is added to $Mkd_n$ when test case do covers function i in module k. In an example embodiment, the regression detection testing system 105 updates the test case attribute in a testcase management tool when each test case is created. In another example embodiment, the regression detection testing system 105 updates the test case attribute in the testcase management tool when each test case is modified.

In an example embodiment, the regression detection testing system 105 identifies each of the software modules associated with each test case $d_n$. In an example embodiment, the regression detection testing system 105 executes a code coverage analysis tool on a plurality of test case groups to identify whether each test case do in the plurality of test case groups provides coverage on a software module and/or a software function. The regression detection testing system 105 then updates the test case attribute $Cd_n$ when the test case do provides the coverage. In an example embodiment, the regression detection testing system 105 executes the code coverage analysis tool to determine a test coverage difference between a baseline code coverage result and a test execution cycle coverage result. In an example embodiment, the regression detection testing system 105 executes the code coverage analysis tool on the plurality of test case groups associated with a product code integration branch associated with the code management tool. Thus, the regression detection testing system 105 leverages the code coverage analysis tool to analyze the delta coverage by comparing the code coverage of test case do execution cycle to the base code coverage result (i.e., a baseline to compare to obtain the differences). For example, a code coverage analysis tool will generate a current baseline code coverage result against the product code on one git branch. The test cases used in the baseline may be predefined tests, for example, by project. The coverage result of a test execution cycle is the result after inputting a set of test cases defined in one group file into the code coverage analysis tool.

In an example embodiment, the regression detection testing system 105 parses the delta coverage result to obtain the target product code modules and functions that are covered by the test case $d_n$, or, for example a suite of test cases. Each element $Mkd_n$ is derived from comparing the code coverage results. Listed below is a construction example of each element $Mkd_n$:

```
{
Name of module k: ../Dedupe/DedupeDecompressCompareActor.cxx
Functions covered: {
    DedupeDecompressCompareActor:: ValidateRequest( ),
    DedupeDecompressCompareActor:: MarkPagesInvalid( ),
    DedupeDecompressCompareActor:: DecompressPages( ),
```

-continued

```
    DedupeDecompressCompareActor:: DecompressPagesDone( ),
    DedupeDecompressCompareActor:: CompleteOperation( ),
    }
}
```

In an example embodiment, the regression detection testing system 105 updates the test case attribute when one of the test cases do in the plurality of test cases comprises at least one software module. In an example embodiment, the regression detection testing system 105 updates the test case attribute when at least one software module comprises at least one software function.

Figure 3:
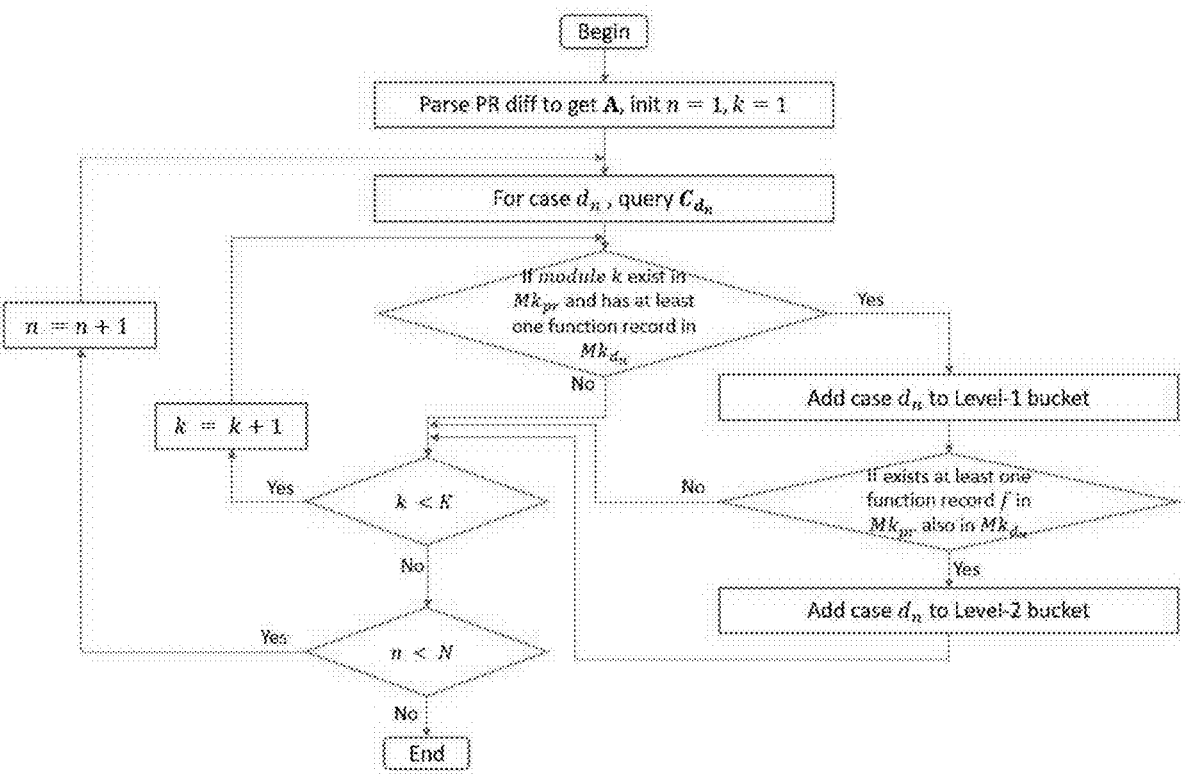
FIG. 3. illustrates a workflow of a regression detection testing system an illustrative embodiment.

FIG. 3 illustrates a workflow of a regression detection testing system an illustrative embodiment. D represents a plurality of test cases, $D=[d_1, d_2, \ldots, d_N]$, where a test case represented as do is test case n, or, in some embodiments, a suite of test cases n, and N is the number of test cases in the plurality of test cases. PR represents the pull request in the code management tool 103, and PR diff is the pull request code difference file. As noted above, the test case attribute (also referred to as the "mapping relationship") $Cd_n=[M1d_n, M2d_n, \ldots, MKd_n]$, where K is the number of modules for the target product code on which test cases are focused, and where $Mkd_n$ records whether test case do has coverage on product code module k. The first plurality of test cases is represented as "Level-1 bucket" and the second plurality of test cases is represented as "Level-2 bucket". In an example embodiment, prior to querying $Cd_n$, the regression detection testing system 105 initializes n=1, and k=1. The regression detection testing system 105 may also empty the first plurality of test cases (i.e., "Level-1 bucket") and the second plurality of test cases (i.e., "Level-2 bucket).

At 206, if the plurality of software modules and software functions $MK_{pr}$ comprises at least one software module k, the regression detection testing system 105 adds the test case do to a first plurality of test cases. In an example embodiment, prior to adding the test case do to the first plurality of test cases, the regression detection testing system 105 determines whether the software module k associated with the test case $d_n$ comprises at least a first software function. In other words, as illustrated in FIG. 3, if module k exists in $Mk_{pr}$, and the module k has at least one function recorded in $Mkd_n$, the regression detection testing system 105 adds do to a first plurality of test cases.

At 208 if the plurality of software modules and software functions $Mk_{pr}$ comprises at least one software function f, and the test case do comprises that software function f, the regression detection testing system 105 adds that test case to a second plurality of test cases. In other words, if $Mk_{pr}$ contains a function f that is also found in $Mkd_n$, the regression detection testing system 105 adds the test case do to the second plurality of test cases.

In an example embodiment, the regression detection testing system 105 performs this iterative comparison (as illustrated in FIG. 3) between the modules and functions in $Mk_{pr}$ and $Mkd_n$ for K and N, where $Cd_n=[M1d_n, M2d_n, \ldots, MKd_n]$, and K is the number of modules for the target product code on which test cases are focused, where D represents a plurality of test cases, $D=[d_1, d_2, \ldots, d_N]$, where a test case represented as do is test case n, or, in some embodiments, a suite of test cases n, and N is the number of test cases in the plurality of test cases. Once this iterative comparison is completed, the regression detection testing system 105 outputs the first plurality of test cases and the second plurality of test cases.

At 210, the software testing life cycle system 101 executes, at least one of the first plurality of test cases and the second plurality of test cases on a test system to perform targeted regression testing on the software code changes. In an example embodiment, the regression detection testing system 105 selects at least one of the first plurality of test cases and the second plurality of test cases based on the pull request. In an example embodiment, the second plurality of test cases provides more specific testing since the second plurality of test cases provides test coverage for the modules impacted by the pull request changes as well as the functions impacted by the pull request changes. On the other hand, performing regression testing using the first plurality of test cases is more aggressive as compared to the second plurality of test cases. For example, the regression detection testing system 105 may determine that the software code changes impact more software modules than software functions in the plurality of software modules and software functions, and in this example scenario, the regression detection testing system 105 selects the first plurality of test cases to execute on the test system. In another example embodiment, the regression detection testing system 105 determines the software code changes impact more software functions than software modules in the plurality of software modules and software functions, and in this example scenario, the regression detection testing system 105 selects the second plurality of test cases to execute on the test system. In yet another example embodiment, the regression detection testing system 105 may determine not to execute the first plurality of test cases, and instead, selects the second plurality of test cases to execute on the test system. Thus, the first and second plurality of test cases are selectable, and the regression detection testing system 105 may select either plurality of test cases to run regression testing.

In an example embodiment, the software testing life cycle 101 completes the pull request to merge the software code changes with the software project repository.

In an example embodiment, there are 1000 target product code modules in one of a product major area; K=1000. In another example embodiment, there are 1,000 test cases, or suites of test cases used to perform testing on the 1000 target product code modules; N=1000, $D=[1, 2, \ldots, 1000]$, $d_n=n$. Each test case $d_n$ has information of coverage pattern on the target product modules and functions, and these are stored in a database in the test case management tool. This information may be updated by comparing the coverage results of a current execution of test case and test case suites and the baseline testing. This results in the construction of $Cd_n$ and each element of $Cd_n$, represented as $Mkd_n$. In an example embodiment, there is a "must pass" group of 200 test cases for this product major area; must_pass_group=[1, 5, 11, $\ldots$, 995]. The "must pass" group is a set of test cases used to ensure that the pull request software code changes have not introduced any serious problems for the major target product functions. Even though the number of regression tests in the "must pass" group is limited, the "must pass" group of test cases may still take many hours to execute. Additionally, the "must pass" group may not be pertinent to the software code changes in the pull request, and there may be regression issues that get overlooked if they are not discovered before the pull request code merge. The must_pass_group=[1, 5, 11, $\ldots$, 995] is eventually compared with the test cases selected by the regression detection testing system 105.

The regression detection testing system 105 identifies the target product code pull request differences, generates and parses the pull request code difference file to obtain the modules and functions that have code changes in the pull request:

```
{
Name of module 100:
...XX/AllocatorHandleUCSubUberCursorPageActor.cxx
Functions covered: {
    AllocatorHandleUCSubUberCursorPageActor::QueryHistoryFromClients;
    }
},
{
Name of module 200:
...XX/AllocatorRestoreOneTxLogSubUberActor.cxx
Functions covered: {
    AllocatorRestoreOneTxLogSubUberActor::RestoreSubUber;
    }
}
```

The regression detection testing system 105 then selects the first plurality of test cases and the second plurality of test cases based on the work flow illustrated in FIG. 3. The results are:

First plurality of test cases: [5, 102, 123, 234, 322, 567, 679, 680]

Second plurality of test cases: [102, 234, 567, 680]

The test cases identified by the regression detection testing system 105 are much more pertinent to verify code changes in the pull request. The number of test cases identified by the regression detection testing system 105 is much smaller than the "must pass" group of test cases, but still effectively detect regression issues. The regression detection testing system 105 may select which level of testing, or a user may have the option to select the level of testing. Executing the first plurality of test cases provides more aggressive testing as compared to the second plurality of test cases.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches.

For example, some embodiments are configured to significantly improve identification of an optimal subset of regression test cases for the software code changes in a pull request. These and other embodiments can effectively improve regression testing for each pull request relative to conventional approaches. For example, embodiments disclosed herein select a set of test cases to execute for regression testing that cover the modules and functions having software code changes in the pull request to obtain the most targeted regression validation result. Embodiments disclosed herein provide selection of the best regression test cases to adequately provide regression testing coverage of the software code changes in a pull request, especially when resources are limited. Embodiments disclosed herein map the test cases and/or test case suites to the covered product code modules and functions by analyzing the difference of coverage between the coverage result of a test execution cycle and the base code coverage result. Embodiments disclosed herein provide a mapping relationship to automatically update the mapping. Embodiments disclosed herein provide a way to select test cases based on the product code changes in a pull request. Embodiments disclosed herein provide a "light weight" set of test cases to target the software code changes in a pull request. Embodiments disclosed herein provide a selectable set of test cases with which to regression test the software code changes in the pull request.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of the information processing system 100, these platforms may also be used to implement at least portions of other information processing systems in other embodiments.

Figure 4:
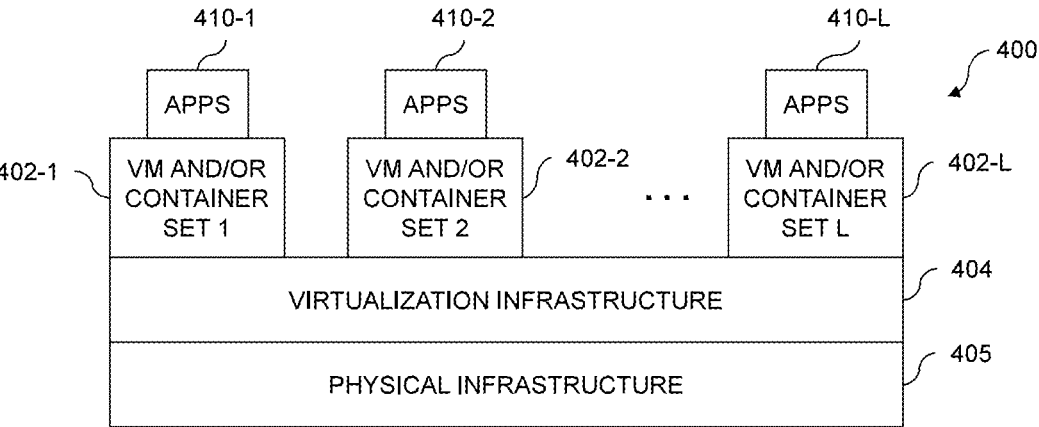
FIGS. 4 and 5 show examples of processing platforms that may be utilized to implement at least a portion of a regression detection testing system embodiments.
Figure 5:
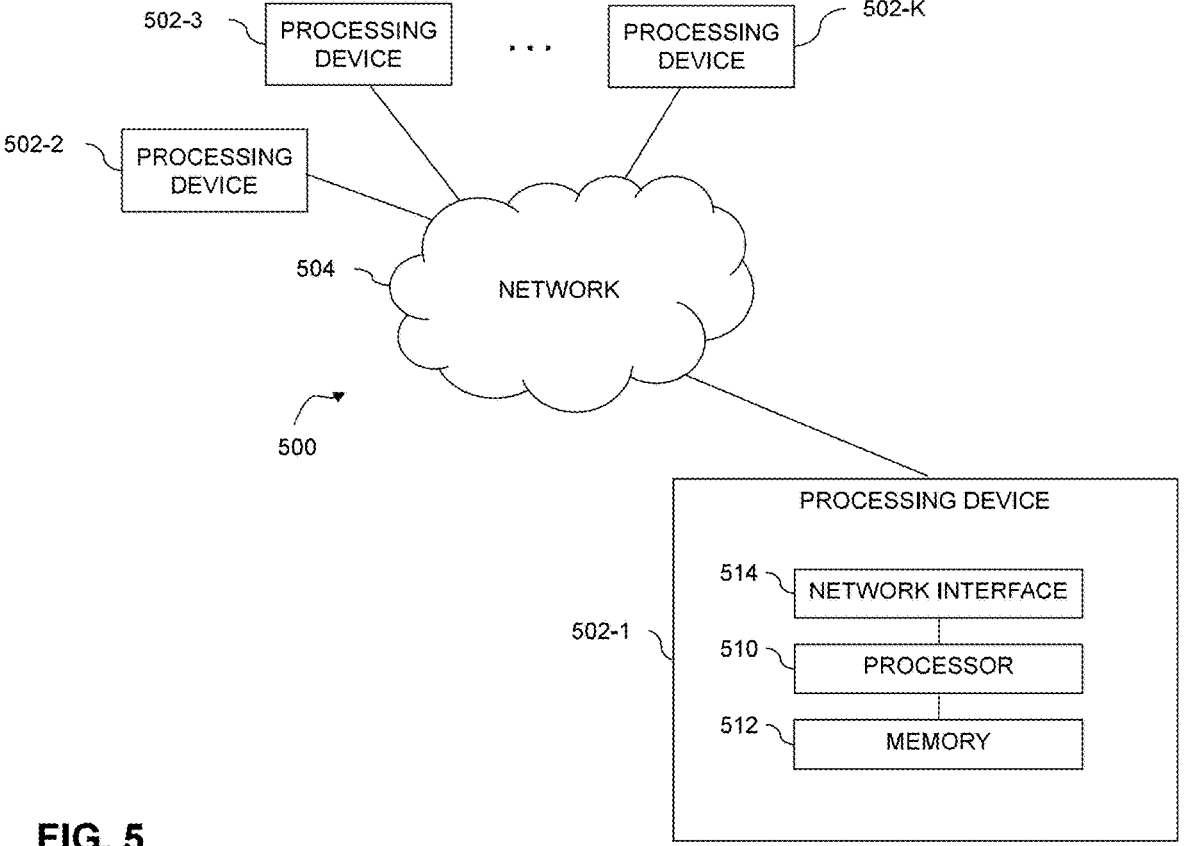

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, where the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of the information processing system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 810 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 804 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method comprising:
receiving, by a code management tool associated with a software test lifecycle system, a pull request to merge software code changes with a software project repository on an information system;
automatically parsing, by a regression detection testing system integrated with the code management tool, a pull request code difference file in real-time upon receiving the pull request to identify the software code changes and generate a dataset comprising elements, wherein each element comprises functions having software code changes in a respective software module, wherein the software code changes comprise a plurality of software modules and software functions;
for each test case in a plurality of test cases, iteratively querying, by the regression detection testing system, a dynamically maintained test case attribute that records real-time coverage mapping of software modules and functions associated with the each test case, the test case attribute associated with the each test case to identify at least one software module associated with the each test case;

if the plurality of software modules and software functions comprises the at least one software module, adding the each test case to a first plurality of test cases;

if the plurality of software modules and software functions comprises at least one software function, and the each test case comprises the at least one software function, adding the each test case to a second plurality of test cases; and executing, by the software test life cycle system, at least one of the first plurality of test cases and the second plurality of test cases on a test system to perform targeted regression testing on the software code changes, wherein the regression detection testing system performs impact analysis to automatically select between the first plurality of test cases and the second plurality of test cases based on determining whether the software code changes impact more modules or more functions in the pull request, wherein the method is implemented by at least one processing device comprising a processor coupled to a memory.

2. The method of claim 1 further comprising:
completing the pull request to merge the software code changes with the software project repository.

3. The method of claim 1 wherein a dataset identifies the software code changes, wherein each element in the dataset comprises a subset of the plurality of software functions and wherein each of the subset is associated with a respective software module in the plurality of software modules.

4. The method of claim 1 wherein receiving, by the code management tool associated with the software test lifecycle system, the pull request to merge software code changes comprises:
receiving a request to execute the targeted regression testing on the software code changes.

5. The method of claim 1 wherein parsing, by the regression detection testing system, the pull request code difference file to identify the software code changes comprises:
creating the pull request code difference file by analyzing the software code changes in the pull request.

6. The method of claim 1 wherein querying, by the regression detection testing system, the test case attribute comprises:
identifying each of the software modules associated with the each test case.

7. The method of claim 1 wherein querying, by the regression detection testing system, the test case attribute comprises:
executing a code coverage analysis tool on a plurality of test case groups associated with a product code integration branch associated with the code management tool to identify whether the each test case provides coverage on at least one of the at least one software module and the at least one software function, wherein the plurality of test case groups comprises the each test case; and
updating the test case attribute when the test case provides the coverage, wherein the code coverage analysis tool integrates with a pull request workflow to automatically update the test case attribute in real-time as test cases are executed.

8. The method of claim 7 wherein executing the code coverage analysis tool on the plurality of test case groups comprises:
executing the code coverage analysis tool to determine a test coverage difference between a baseline code coverage result and a test execution cycle coverage result.

9. The method of claim 7 wherein executing the code coverage analysis tool on the plurality of test case groups comprises:
executing the code coverage analysis tool on the plurality of test case groups associated with the product code integration branch associated with the code management tool.

10. The method of claim 1 wherein querying the test case attribute comprises:
updating the test case attribute when the each test case comprises the at least one software module.

11. The method of claim 10 further comprising:
updating the test case attribute when the at least one software module comprises the at least one software function.

12. The method of claim 1 wherein querying, by the regression detection testing system, the test case attribute comprises:
updating the test case attribute when the each test case is created.

13. The method of claim 1 wherein querying the test case attribute comprises:
updating the test case attribute when the each test case is modified.

14. The method of claim 1 wherein if the plurality of software modules and software functions comprises the at least one software module, adding the each test case to the first plurality of test cases comprises:
prior to adding the each test case to the first plurality of test cases, determining the at least one software module associated with the each test case comprises at least a first software function.

15. The method of claim 1 wherein executing the at least one of the first plurality of test cases and the second plurality of test cases comprises:
selecting at least one of the first plurality of test cases and the second plurality of test cases based on the pull request, wherein selecting comprises performing automated impact analysis comparing module-level changes versus function-level changes in the pull request to determine optimal test execution strategy.

16. The method of claim 15 wherein selecting the at least one of the first plurality of test cases and the second plurality of test cases based on the pull request comprises:
determining the software code changes impact more product code changes in software modules than in the software functions in the plurality of software modules and software functions; and
selecting the first plurality of test cases to execute on the test system.

17. The method of claim 15 wherein selecting the at least one of the first plurality of test cases and the second plurality of test cases based on the pull request comprises:
determining the software code changes impact more product code changes in software functions than in the software modules in the plurality of software modules and software functions; and
selecting the second plurality of test cases to execute on the test system.

18. The method of claim 15 wherein selecting the at least one of the first plurality of test cases and the second plurality of test cases based on the pull request comprises:
determining not to execute the first plurality of test cases; and
in response to determining not to execute the first plurality of test cases, selecting the second plurality of test cases to execute on the test system.

19. A system comprising:

at least one processing device comprising a processor coupled to a memory;

the at least one processing device being configured:

to receive, by a code management tool associated with a software test lifecycle system, a pull request to merge software code changes with a software project repository on an information system;

to automatically parse, by a regression detection testing system integrated with the code management tool, a pull request code difference file in real-time upon receiving the pull request to identify the software code changes and to generate a dataset comprising elements, wherein each element comprises functions having software code changes in a respective software module, wherein the software code changes comprise a plurality of software modules and software functions;

for each test case in a plurality of test cases, to iteratively query, by the regression detection testing system, a dynamically maintained test case attribute that records real-time coverage mapping of software modules and functions associated with the each test case, the test case attribute associated with the each test case to identify at least one software module associated with the each test case;

if the plurality of software modules and software functions comprises the at least one software module, to add the each test case to a first plurality of test cases;

if the plurality of software modules and software functions comprises at least one software function, and the each test case comprises the at least one software function, to add the each test case to a second plurality of test cases; and to execute, by the software test life cycle system, at least one of the first plurality of test cases and the second plurality of test cases on a test system to perform targeted regression testing on the software code changes, wherein the regression detection testing system performs impact analysis to automatically select between the first plurality of test cases and the second plurality of test cases based on determining whether the software code changes impact more modules or more functions in the pull request.

20. A computer program product comprising a non-transitory processor-readable storage medium having stored therein program code of one or more software programs, wherein the program code when executed by at least one processing device causes said at least one processing device:

to automatically parse, by a regression detection testing system integrated with the code management tool, a pull request code difference file in real-time upon receiving the pull request to identify the software code changes and to generate a dataset comprising elements, wherein each element comprises functions having software code changes in a respective software module, wherein the software code changes comprise a plurality of software modules and software functions;

for each test case in a plurality of test cases, to iteratively query, by the regression detection testing system, a dynamically maintained test case attribute that records real-time coverage mapping of software modules and functions associated with the each test case, the test case attribute associated with the each test case to identify at least one software module associated with the each test case;

if the plurality of software modules and software functions comprises the at least one software module, to add the each test case to a first plurality of test cases;

if the plurality of software modules and software functions comprises at least one software function, and the each test case comprises the at least one software function, to add the each test case to a second plurality of test cases; and to execute, by the software test life cycle system, at least one of the first plurality of test cases and the second plurality of test cases on a test system to perform targeted regression testing on the software code changes, wherein the regression detection testing system performs impact analysis to automatically select between the first plurality of test cases and the second plurality of test cases based on determining whether the software code changes impact more modules or more functions in the pull request.

* * * * *